(12) United States Patent
Li et al.

(10) Patent No.: US 11,704,090 B2
(45) Date of Patent: Jul. 18, 2023

(54) AUDIO INTERACTIVE DISPLAY SYSTEM AND METHOD OF INTERACTING WITH AUDIO INTERACTIVE DISPLAY SYSTEM

(71) Applicant: AVer Information Inc., New Taipei (TW)

(72) Inventors: Wei-Cheng Li, New Taipei (TW); Yun-Long Sie, New Taipei (TW)

(73) Assignee: AVer Information Inc., New Taipei (TW)

( * ) Notice: Subject to any disclaimer, the term of this patent is extended or adjusted under 35 U.S.C. 154(b) by 0 days.

(21) Appl. No.: 17/653,460

(22) Filed: Mar. 3, 2022

(65) Prior Publication Data
US 2022/0283776 A1    Sep. 8, 2022

(30) Foreign Application Priority Data

Mar. 4, 2021    (TW) ................. 110107751

(51) Int. Cl.
| | |
|---|---|
| *G06F 3/16* | (2006.01) |
| *G06V 10/74* | (2022.01) |
| *G06V 30/412* | (2022.01) |
| *G06F 3/0481* | (2022.01) |
| *G10L 15/22* | (2006.01) |
| *G10L 15/26* | (2006.01) |
| *G06F 40/30* | (2020.01) |
| *G06F 40/279* | (2020.01) |

(52) U.S. Cl.
CPC ............ *G06F 3/167* (2013.01); *G06F 3/0481* (2013.01); *G06F 40/279* (2020.01); *G06F 40/30* (2020.01); *G06V 10/74* (2022.01); *G06V 30/412* (2022.01); *G10L 15/22* (2013.01); *G10L 15/26* (2013.01)

(58) Field of Classification Search
CPC ........ G06F 3/167; G06F 40/279; G06F 40/30; G06F 3/0481; G06V 10/74; G06V 30/412; G10L 15/22; G10L 15/26
See application file for complete search history.

(56) References Cited

U.S. PATENT DOCUMENTS

| | | | |
|---|---|---|---|
| 9,116,989 B1 * | 8/2015 | Ehlen .................. | G06F 3/04842 |
| 11,289,091 B2 * | 3/2022 | Srivastava .............. | G06F 3/167 |
| 2008/0069480 A1 * | 3/2008 | Aarabi ................ | G06F 16/5854 |
| | | | 707/E17.031 |
| 2014/0365203 A1 | 12/2014 | Waibel | |

* cited by examiner

*Primary Examiner* — Haoshian Shih
(74) *Attorney, Agent, or Firm* — CKC & Partners Co., LLC

(57) ABSTRACT

A display system and method of interacting with the display system are provided. The method of interacting with the display system comprises following steps: receiving an audio signal through an audio input device; converting the audio signal to corresponding text data through a voice-to-text converting module; generating a corresponding display image according to a document file; acquiring multiple identification data corresponding to the display image from the document file; comparing the text data with the identification data; and if the text data corresponds to one of the identification data, moving or displaying a marker on the display image through the display system according to a coordinate of one of the identification data.

12 Claims, 8 Drawing Sheets

AUDIO INTERACTIVE DISPLAY SYSTEM AND METHOD OF INTERACTING WITH AUDIO INTERACTIVE DISPLAY SYSTEM

CROSS-REFERENCE TO RELATED APPLICATION

This application claims priority to Taiwan Application Serial Number 110107751, filed Mar. 4, 2021, which is herein incorporated by reference in its entirety.

BACKGROUND

Field of Invention

The present invention relates to a display system and a method of interacting with the display system. More particularly, the present invention relates to a display system and a method of interacting with the display system that convert audio signal to text data.

Description of Related Art

Under general circumstances, when a user uses a slide or other types of files to give a speech, it is often necessary to cooperate with a mouse pointer or a laser pointer of a computer device to manually operate, so as to mark the current speech content on the slide.

However, the above manual operation may affect the fluency of the user's speech, and the laser pointer or the mouse pointer is not conducive to the audience identification of the remote video.

SUMMARY

The present disclosure is to provide a method of interacting with a display system. The method of interacting with a display system comprises: receiving an audio signal through an audio input device; converting the audio signal to corresponding text data through a voice-to-text converting module; generating a corresponding display image according to a document file; acquiring multiple identification data corresponding to the display image from the document file through an analysis module; comparing the text data with the identification data; and moving or displaying a marker on the display image through the display system according to a coordinate of one of the identification data if the text data corresponds to one of the identification data.

The present disclosure is to provide a display system. The display system comprises a display module, an audio input device, a voice-to-text converting module, an analysis module, and a processor. The display module is configured to generate a corresponding display image according to a document file. The audio input device is configured to receive an audio signal. The voice-to-text converting module is coupled to the audio input device, and the voice-to-text converting module is configured to convert the audio signal to corresponding text data. The analysis module is configured to acquire multiple identification data corresponding to the display image from the document file and store the identification data in a memory. The processor is coupled to the memory and the display module, and the processor is configured to read the identification data and perform following operations: comparing the text data with the identification data; and moving or displaying a marker on the display image according to a coordinate of one of the identification data if the text data corresponds to one of the identification data.

One of the advantages of the above-mentioned display system and the method of interacting with the display system is that the corresponding speech content can be automatically marked in the document file according to the speech of the user in real time.

DETAILED DESCRIPTION

Reference will now be made in detail to the present embodiments of the disclosure, examples of which are illustrated in the accompanying drawings. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

All the terms used in this document generally have their ordinary meanings. The examples of using any terms discussed herein such as those defined in commonly used dictionaries are illustrative only, and should not limit the scope and meaning of the disclosure. Likewise, the present disclosure is not limited to some embodiments given in this document.

It shall be appreciated that the module and the unit of the present disclosure are not limited to hardware implementations. In some embodiments, the module and the unit of the present disclosure may be implemented by the software.

Figure 1:
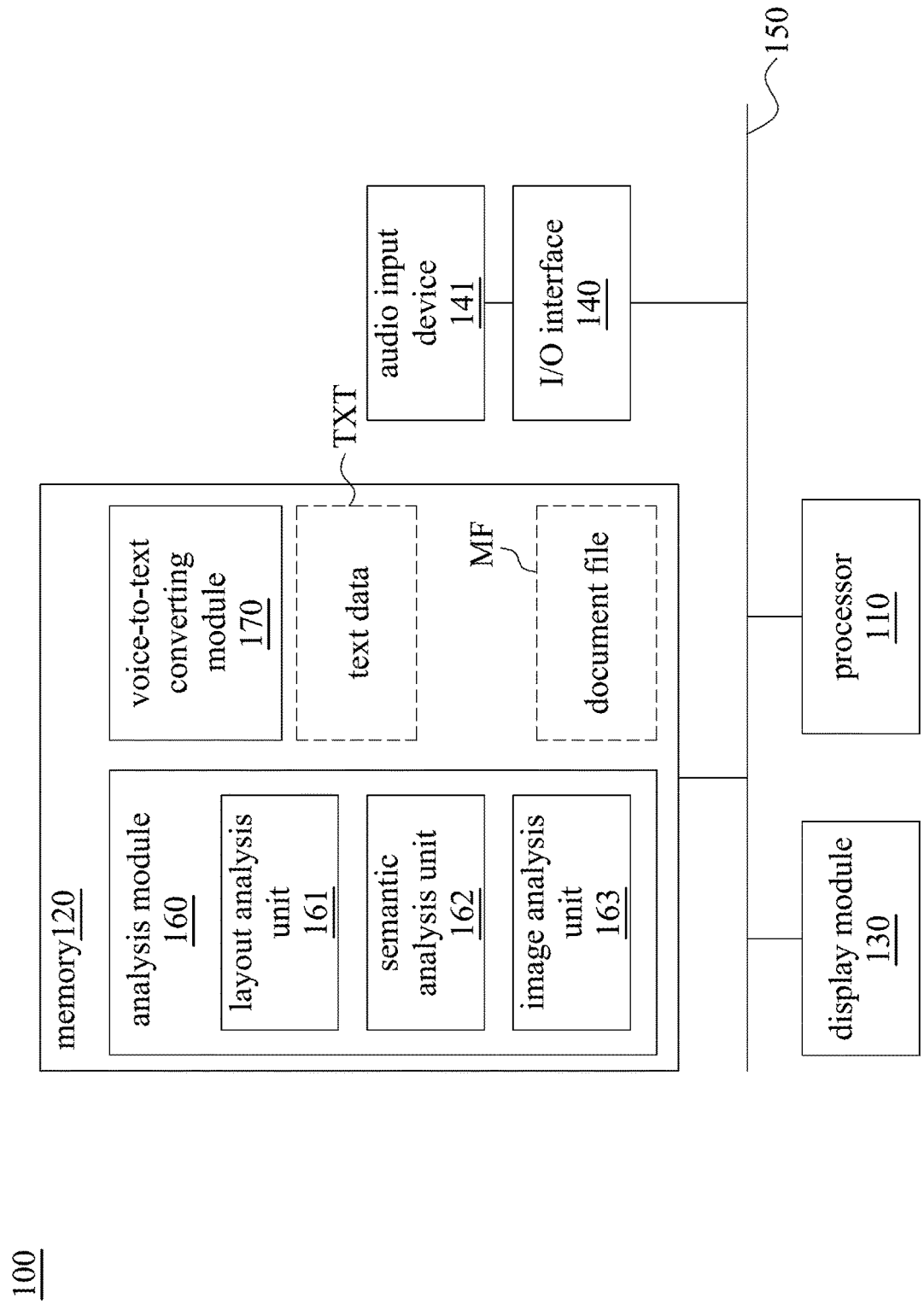
FIG. 1 is a schematic diagram of a display system according to some embodiments of the present disclosure.

FIG. 1 is a functional block diagram of a display system 100 according to some embodiments of the present disclosure. As shown in FIG. 1, the display system 100 comprises a processor 110, a memory 120, a display module 130, an input/output interface 140 (hereinafter referred to as the I/O interface 140), a bus 150, and an audio input device 151.

The processor 110, the memory 120, the display module 130, and the I/O interface 140 can be communicatively coupled to each other through the bus 150, so as to cooperate with each other. For example, the processor 110 can read or execute the document file MF stored in the memory 120 through the bus 150, and display the display image of the document file MF through the display module 130. In addition, the I/O interface 140 can be used as a data input/output interface for an external input device (e.g., the audio input device 141) to transmit voice data through the bus 150.

The memory 120 stores an analysis module 160 and a voice-to-text converting module 170. The analysis module 160 comprises a layout analysis unit 161, a semantic analysis unit 162, and an image analysis unit 163. In some embodiments, the processor 110 is configured to execute the layout analysis unit 161 in the analysis module 160 to acquire data about the layout information in the document file MF, execute the semantic analysis unit 162 to acquire the data about the text in the document file MF, and execute the image analysis unit 163 to acquire the data about the image information in the document file MF. The voice-to-text converting module 170 converts the audio signal received by the audio input device 141 to corresponding text data TXT. The specific operations of the analysis module 160 and the voice-to-text converting module 170 will be described later in more detail with reference to FIGS. 2A to 2C.

In some embodiments, the processor 110 may be implemented by a central processing unit (CPU), a microprocessor (MCU), or other suitable processors.

In some embodiments, the memory 120 may comprise any type of system memory, such as static random access memory (SRAM), dynamic random access memory (DRAM), or read-only memory (ROM).

In some embodiments, the bus 150 may be one or more of a number of bus structures of any type, including a memory bus or memory controller, peripheral bus, video bus busbars or other suitable busbars.

Figure 2A:
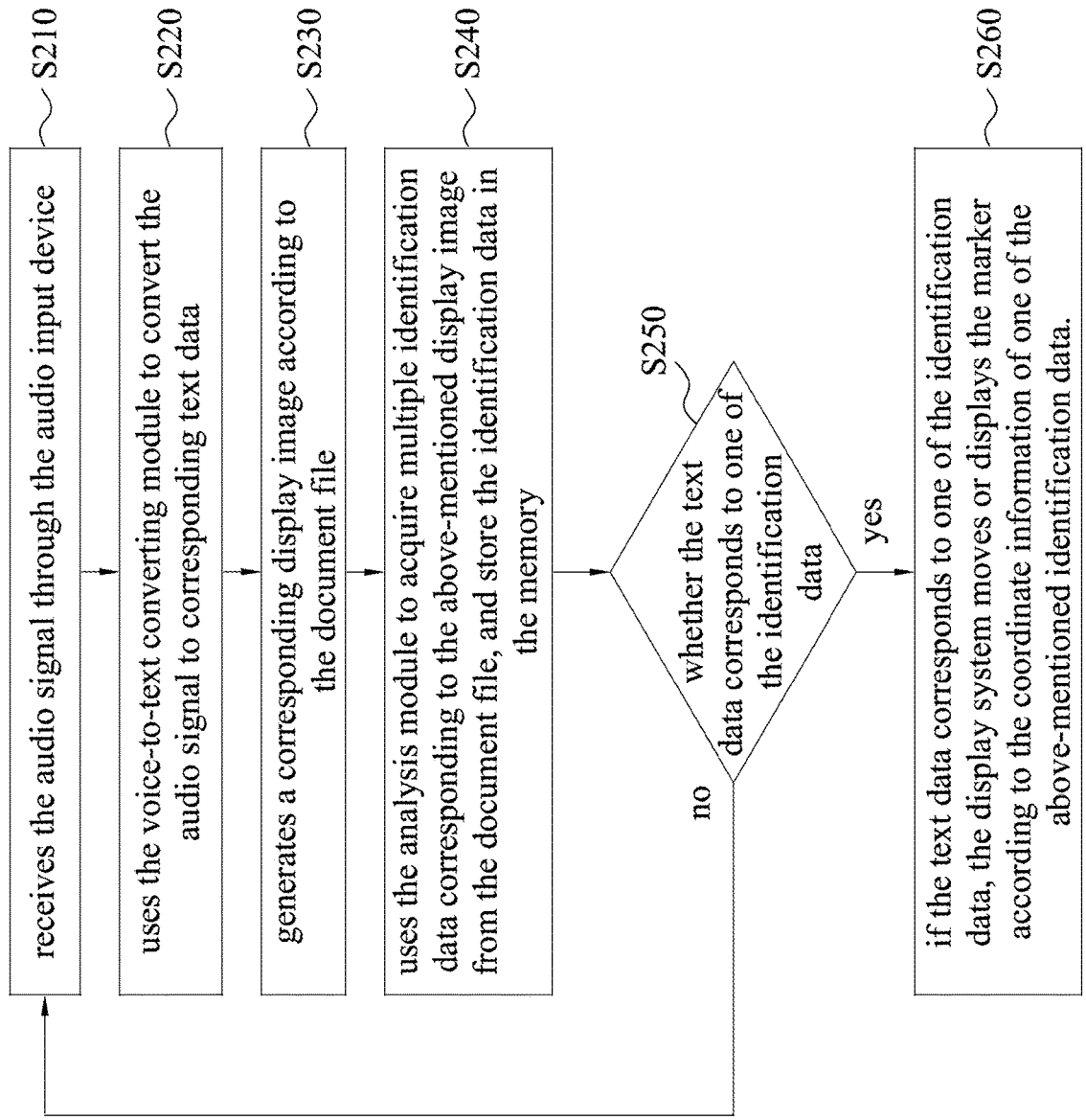
FIGS. 2A-2C are flowcharts of methods of interacting with a display system according to some embodiments of the present disclosure.
Figure 2B:
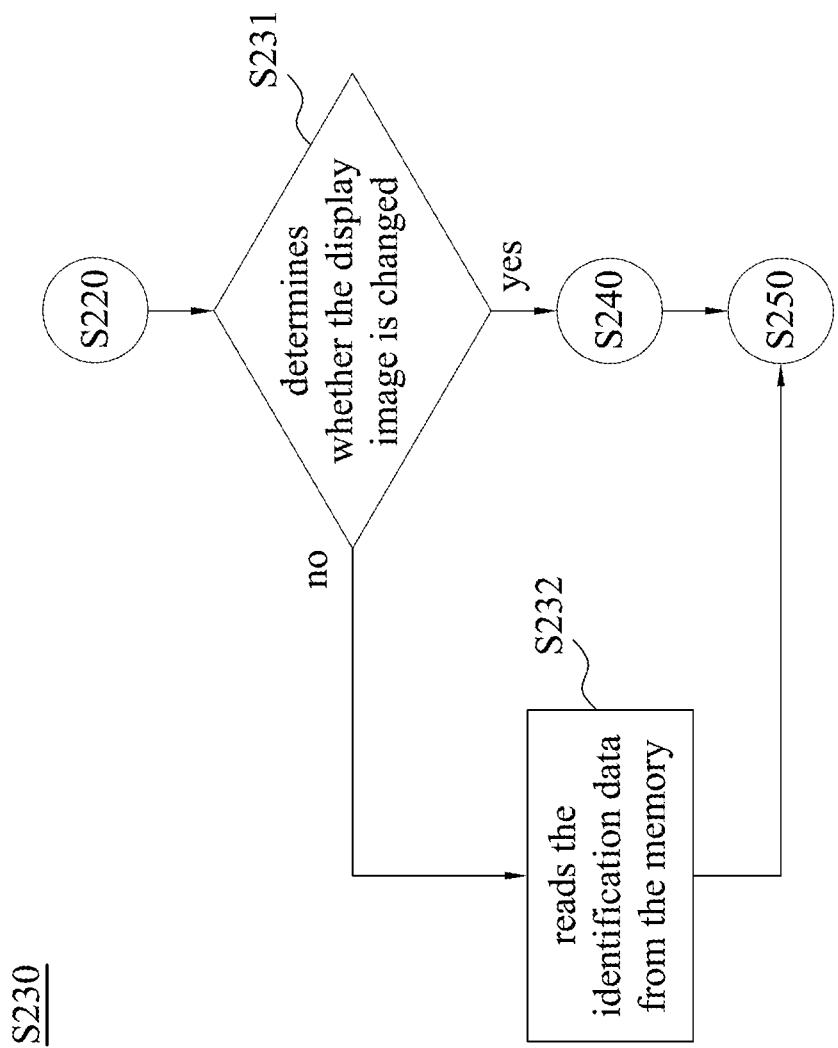
Figure 2C:
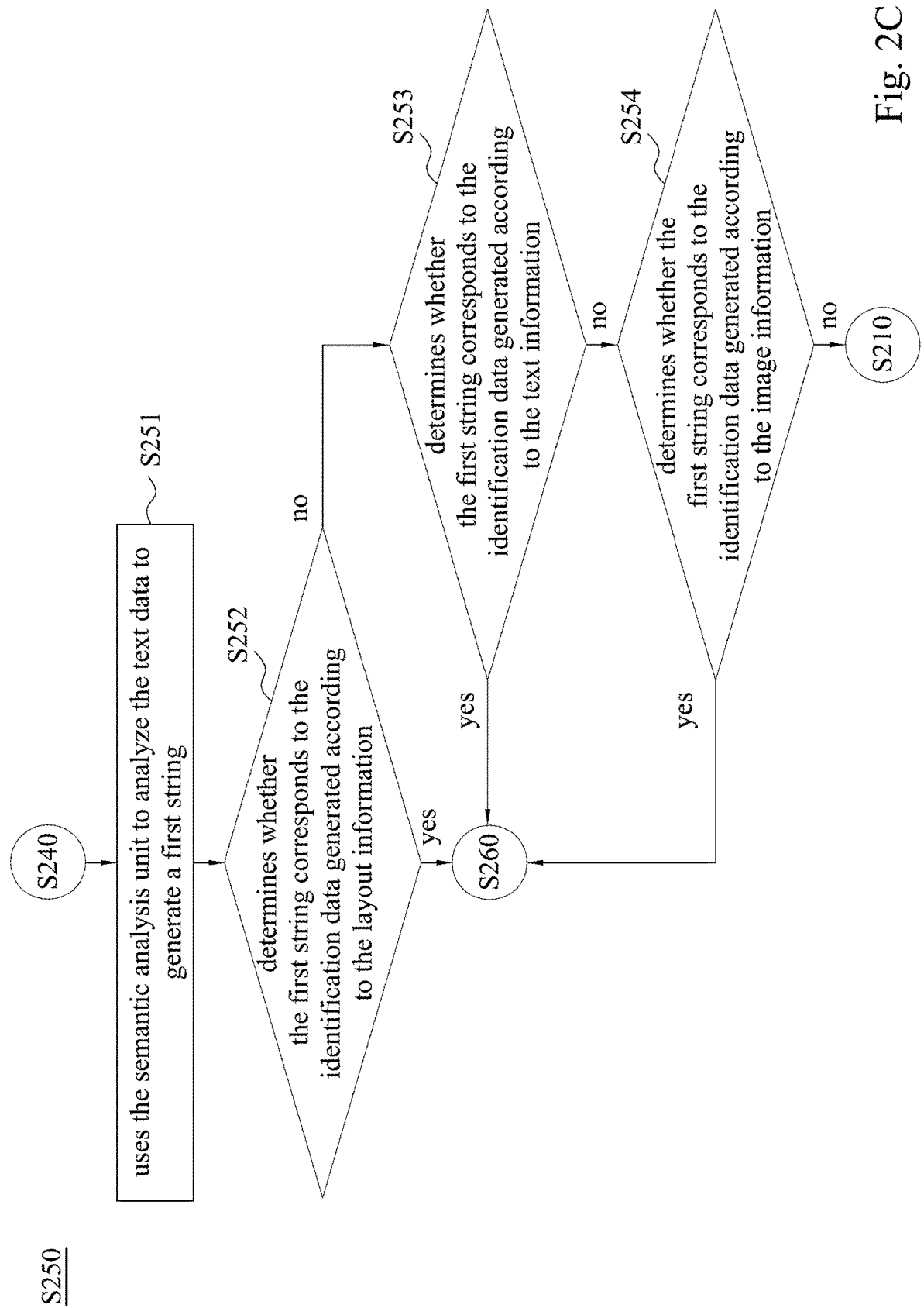

FIGS. 2A-2C are flowcharts of a method 200 of interacting with the display system 100 according to some embodiments of the present disclosure. For the convenience of description, the steps of the interacting method 200 shown in FIGS. 2A to 2C are described with reference to FIG. 1, but the steps are not limited thereto.

As shown in FIG. 2A, in the step S210, the display system 100 receives the audio signal through the audio input device 141. The display system 100 uses the voice-to-text converting module 170 to convert the audio signal to corresponding text data TXT in the step S220. For example, when the user is speaking, the audio input device 141 (e.g., a microphone) will transmit the user's audio to the voice-to-text converting module 170 through the I/O interface 140 and the bus 150 for converting to the text data TXT. In practice, the voice-to-text converting module 170 is an application program that can be executed by the processor 110, such as Speechnotes, Speech-to-Text or other application software with similar functions.

In the step S230, the display module 130 generates a corresponding display image according to the document file MF. In some embodiments, the document file MF comprises files such as Microsoft PowerPoint, Microsoft Word, or Portable Document Format (PDF). For example, the processor 110 can access the presentation file stored in the memory 120 in advance, and display the display image of the presentation file through the display module 130 (for example, the display image 300 in FIG. 3 or the display image 400 in FIG. 4 in the following paragraphs).

In the step S240, the analysis module 160 acquires multiple identification data corresponding to the above-mentioned display image from the document file MF, and store the above-mentioned identification data in the memory 120. For convenience of description, the process S204 in FIG. 2 will be described below with reference to FIG. 3, but it is not limited thereto.

Figure 3:
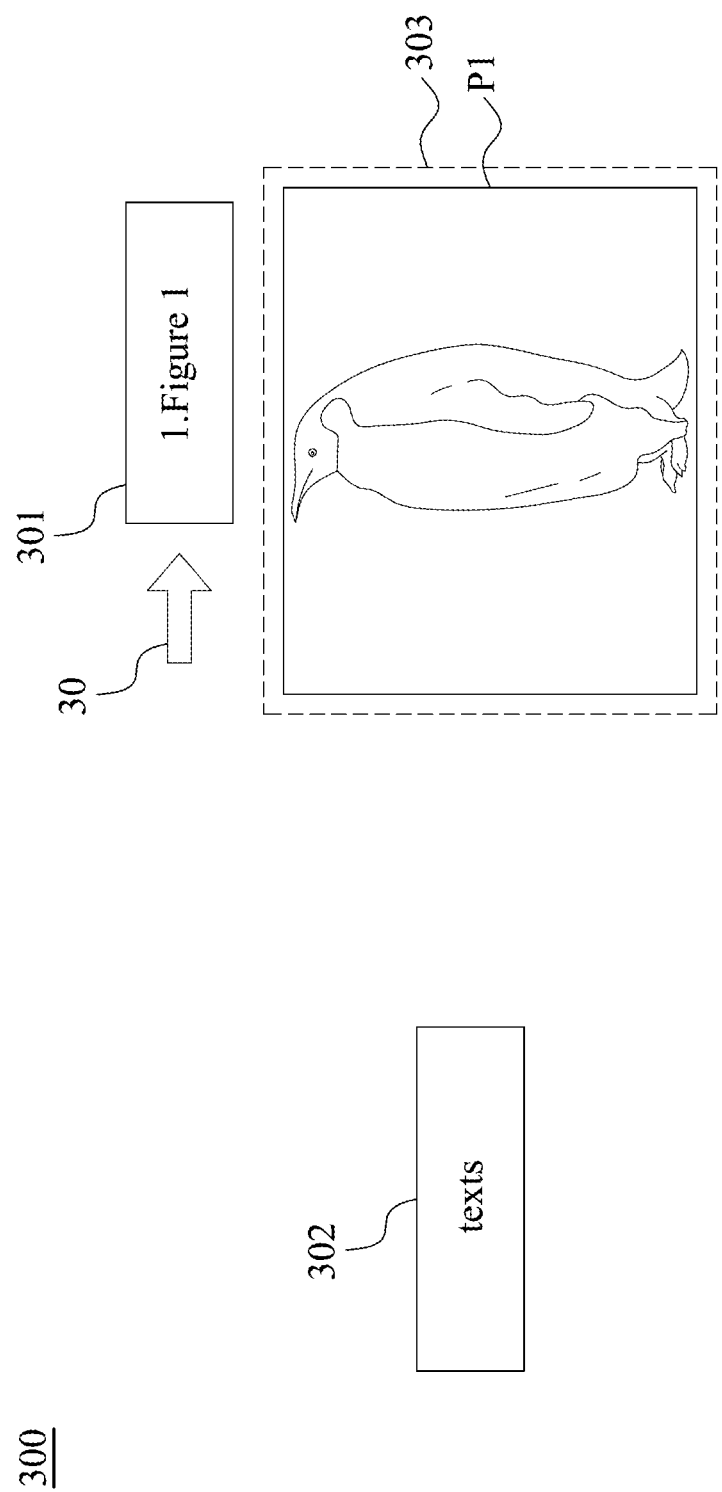
FIG. 3 is a schematic diagram of an display image of a document file according to an embodiment of the present disclosure.

FIG. 3 is a schematic diagram of the display image 300 of the document file MF according to an embodiment of the present disclosure. As shown in FIG. 3, the display image 300 of the document file MF comprises layout information (for example, "1. FIG. 1"), text information (for example, "texts"), and image information (for example, a picture P1). In some embodiments, the layout information of the document file MF comprises a layout design, an item symbol, or an item number of the document file MF, wherein the layout design refers to the distribution or arrangement of the objects in the display image 300.

In some embodiments, in the step S240, the above-mentioned layout information "1. FIG. 1" is acquired by the layout analysis unit 161 as the identification data 301, and the text information "texts" is acquired by the semantic analysis unit 162 as the identification data 302, the image information (e.g., the picture P1) is acquired by the image analysis unit 163 as the identification data 303. The above-mentioned identification data 301 to 303 are stored in the memory 120, and the identification data 301 to 303 respectively comprise the coordinate information of "1. FIG. 1", "texts", and the picture P1 in the display image 300.

Next, in the step S250, the processor 110 compares the text data TXT generated by the voice-to-text converting module 170 with the above-mentioned identification data 301~303. If the text data TXT corresponds to one of the identification data of the identification data 301~303, in the step S260, the display system 100 moves or displays the marker 30 on the display image 300 according to the coordinate information of the identification data.

For example, when the user speaks "FIG. 1", the user's audio is converted to the corresponding text data TXT "FIG. 1" by the voice-to-text converting module 170, and the processor 110 compares the text data TXT "FIG. 1" with the identification data 301~303, respectively. At this time, the processor 110 determines that the text data TXT "FIG. 1" corresponds to "1. FIG. 1" in the identification data 301. Therefore, the display system 100 displays or moves the marker 30 on the display image 300 to the coordinates corresponding to "1. FIG. 1".

On the other hand, if the text data TXT does not correspond to any one of the identification data 301~303, the display system 100 may execute the step S210 again to restart the method 200 of interacting with the display system 100.

Figure 4:
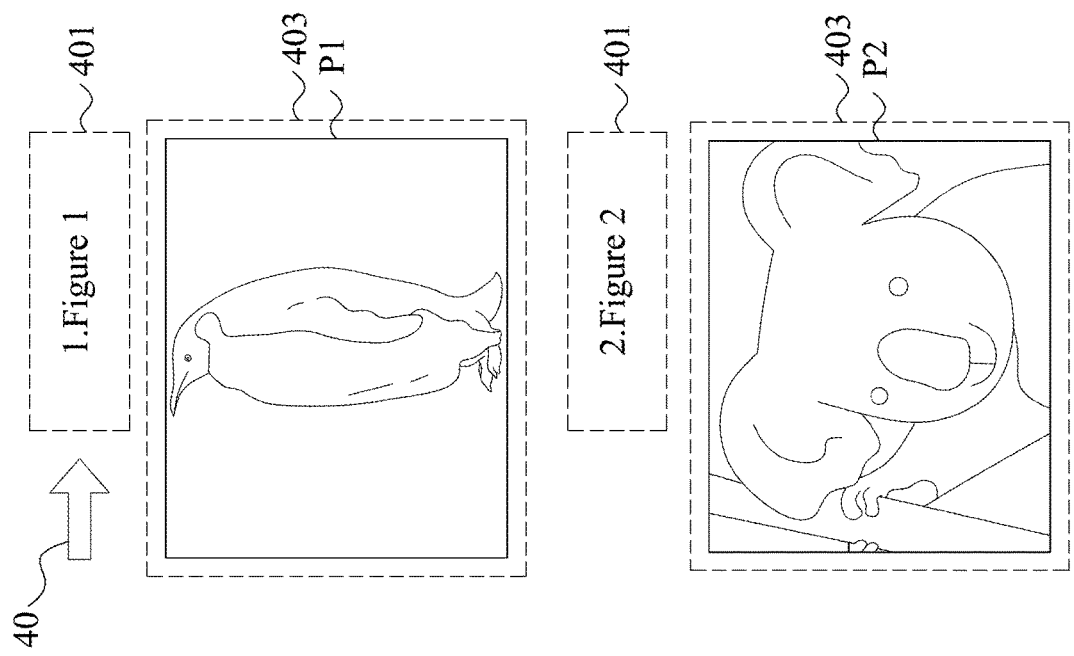
FIG. 4 is a schematic diagram of another display image of a document file according to an embodiment of the present disclosure.
Figure 4:
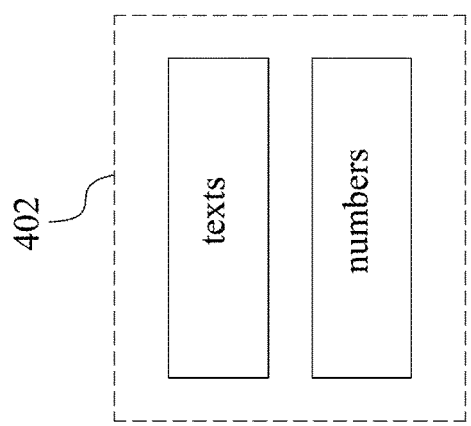

FIG. 4 is a schematic diagram of another display image 400 of the document file MF according to an embodiment of the present disclosure. The difference between the display image 300 and the display image 400 is that the layout information of the display image 400 additionally comprises "2. FIG. 2", the text information additionally comprises "numbers", and the image information additionally comprises the picture P2.

In other words, the layout analysis unit 161 acquires the above-mentioned "1. FIG. 1" and "2. FIG. 2" in the step S240 as the identification data 401, the semantic analysis unit 162 acquires "texts" and "numbers" as the identification data 402, and the image analysis unit 163 acquires the pictures P1 and P2 as the identification data 403, and the above identification data 401~403 are stored in the memory 120.

In the embodiment of FIG. 4, when the user speaks "FIG. 1", the processor 110 compares the text data TXT "FIG. 1" with the identification data 401~403 respectively, and when comparing the identification data 401, the processor 110 further compares the text data TXT "FIG. 1" with "1. FIG. 1" and "2. FIG. 2" in the identification data 401, respectively.

In this way, when the processor 110 determines in the step S260 that the text data TXT "FIG. 1" corresponds to "1. FIG. 1" in the identification data 401, the display system 100 displays or moves the marker 40 to the coordinates corresponding to "1. FIG. 1" on the display image 400.

It shall be appreciated that the index arrows of the marker 30 in FIG. 3 and the marker 40 in FIG. 4 are only exemplary. In other embodiments, the markers 30 and 40 can also be markers of other shapes, such as a frame line surrounding the target area or other objects with similar marking functions.

In some embodiments, please refer to FIG. 2B, the step S230 further comprises a step S231 and a step S232. In the step S231, the display system 100 determines whether the display image corresponding to the document file MF is changed. For example, the document file MF comprises the first slide corresponding to the display image 300 and the second slide corresponding to the display image 400. When the user switches from playing the first slide to playing the second slide, the display image 300 on the display module 130 is changed to the display image 400. In this way, the display system 100 acquires the identification data 401~403 corresponding to the display image 400 by executing the step S240, and stores the identification data 401~403 in the memory 120.

On the other hand, if the user does not switch the playing slides, the display image 300 of the display module 130 will not change. Therefore, the display system 100 does not need to repeatedly acquire the data corresponding to the display image 300. The display system 100 can directly read the identification data 301~303 from the memory 120 in the step S232.

In some embodiments, please refer to FIG. 2C, the step S250 further comprises the steps S251~S254. In the step S251, the analysis module 160 uses the semantic analysis unit 162 to analyze the text data TXT converted from the user's speech to generate a corresponding first string. In some embodiments, the semantic analysis unit 162 may perform semantic analysis through a machine-learned Artificial Neural Network (ANN) to analyze abstracts or keywords from a long string of text. For example, when the user speaks a long sentence "Please see FIG. 1 in the following figures", the semantic analysis unit 162 may acquire the appropriate keyword "FIG. 1" from the text data TXT of the above-mentioned long sentence as the first string.

In the step S252, the processor 110 determines whether the above-mentioned first string corresponds to the identification data (e.g., identification data 301 or 401) generated according to the layout information. If so, the display system 100 may continue to execute the step S260 to display or move the marker according to the coordinate of the identification data. The step for the processor 110 to determine whether the first string (e.g., "FIG. 1") corresponds to the identification data generated according to the layout information is similar to the step recited in the previous paragraph, and the details will not be repeated herein.

On the other hand, if the first string does not correspond to the identification data (e.g., the identification data 301 or 401) generated according to the layout information, then in the step S253, the processor 110 may then determine whether the first string corresponds to the identification data (e.g., identification data 302 or 402) generated according to the text information. For example, when the semantic analysis unit 162 acquires the keyword "numbers" from the text data TXT "sum of numbers" as the first string, if the processor 110 determines that the first string "numbers" cannot correspond to the identification data 301, the processor 110 may continue to compare the first string "numbers" with the identification data 302. Similarly, if the processor 110 determines that the first string "numbers" cannot correspond to the identification data 401, the processor 110 may continue to compare the first string "numbers" with the identification data 402.

In some embodiments, when the processor 110 compares the first string with the identification data (e.g., the identification data 302 or 402) generated according to the text information, the processor 110 calculates a matching index between the first string and the identification data to determine whether the first string corresponds to text information. In the embodiment of the present disclosure, the processor 110 calculates the matching index between the first string and the identification data based on natural language processing (NLP), but the present disclosure is not limited thereto. The matching index represents the degree of lexical similarity between the first string and the identification data. That is, the higher the matching index, the higher the similarity between the first string and the identification data. If the matching index is greater than or equal to the preset value, the processor 110 may determine that the first string corresponds to the identification data generated according to the text information, wherein a higher matching index represents a higher correspondence degree between the identification data generated according to the text information and the first string.

For example, please refer to FIG. 3, when the processor 110 compares the first string "numbers" with the identification data 302, the processor 110 calculates the matching index between the first string "numbers" and the identification data 302 "texts". Since the correspondence degree between the first string "numbers" and the identification data 302 "texts" is relatively low, the above-mentioned matching index may be lower than the preset value. Therefore, the processor 110 determines that the first string does not correspond to the identification data 302, and proceeds to the step S254.

Figure 5:
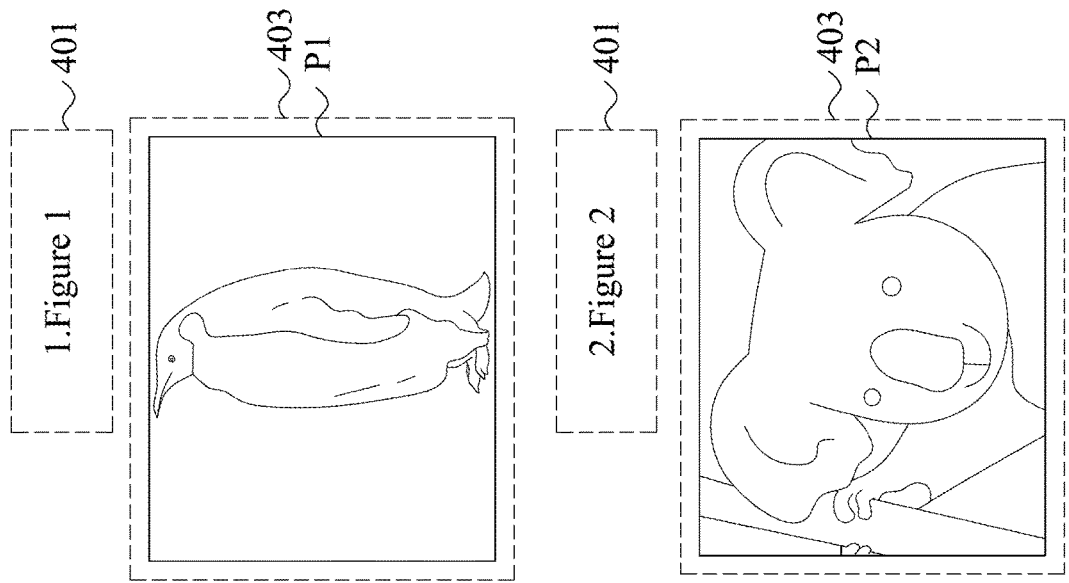
FIG. 5 is a schematic diagram of another display image of a document file according to another embodiment of the present disclosure.
Figure 5:
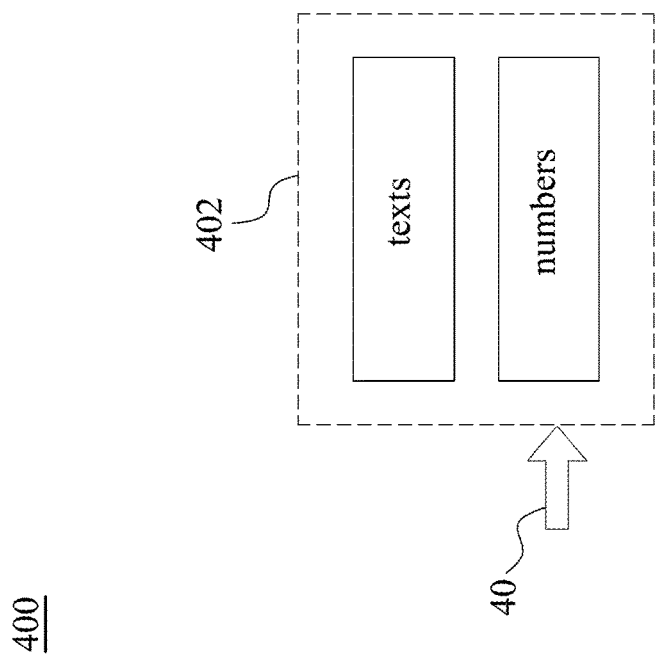

In addition, taking FIG. 5 as an example, when the processor 110 compares the first string "numbers" with the identification data 402, the processor 110 calculates the matching indexes of the first string "numbers" corresponding to the "texts" and "numbers" of the identification data 402 respectively. Since the "number" in the identification data 402 corresponds to the first string "numbers" and has a matching index higher than the preset value, the display system 100 executes the step S260 to display or move the marker 40 on the display image 400 to the coordinates corresponding to "numbers".

In the step S254, the processor 110 determines whether the first string corresponds to the data of the image information (e.g., the identification data 303 or 403). Taking FIG. 3 as an example, the semantic analysis unit 162 acquires the keyword "Penguin" from the text data TXT "Penguin of Antarctica" as the first string, and when the first string cannot correspond to the identification data 301 and 302 in the display image 300 (that is, the determinations of the step S252 and the step S253 are both "No"), the processor 110 may then compare the first string with the picture P1 in the identification data 303. Similarly, when the first string cannot correspond to the identification data 401 and 402 in the display image 400, the processor 110 may then compare the first string with the pictures P1 and P2 in the identification data 403.

In some embodiments, when the processor 110 compares the first string with the identification data generated according to the image information, the processor 110 may calculate a matching index between the first string and the identification data generated according to the image information to determine whether the first string corresponds to the identification data generated according to the image information. If the matching index is greater than or equal to the preset value, the processor 110 determines that the first string corresponds to the identification data generated according to the image information, wherein a higher matching index represents a higher correspondence degree (i.e., the matching degree) between the identification data generated according to the image information and the first string.

Figure 6:
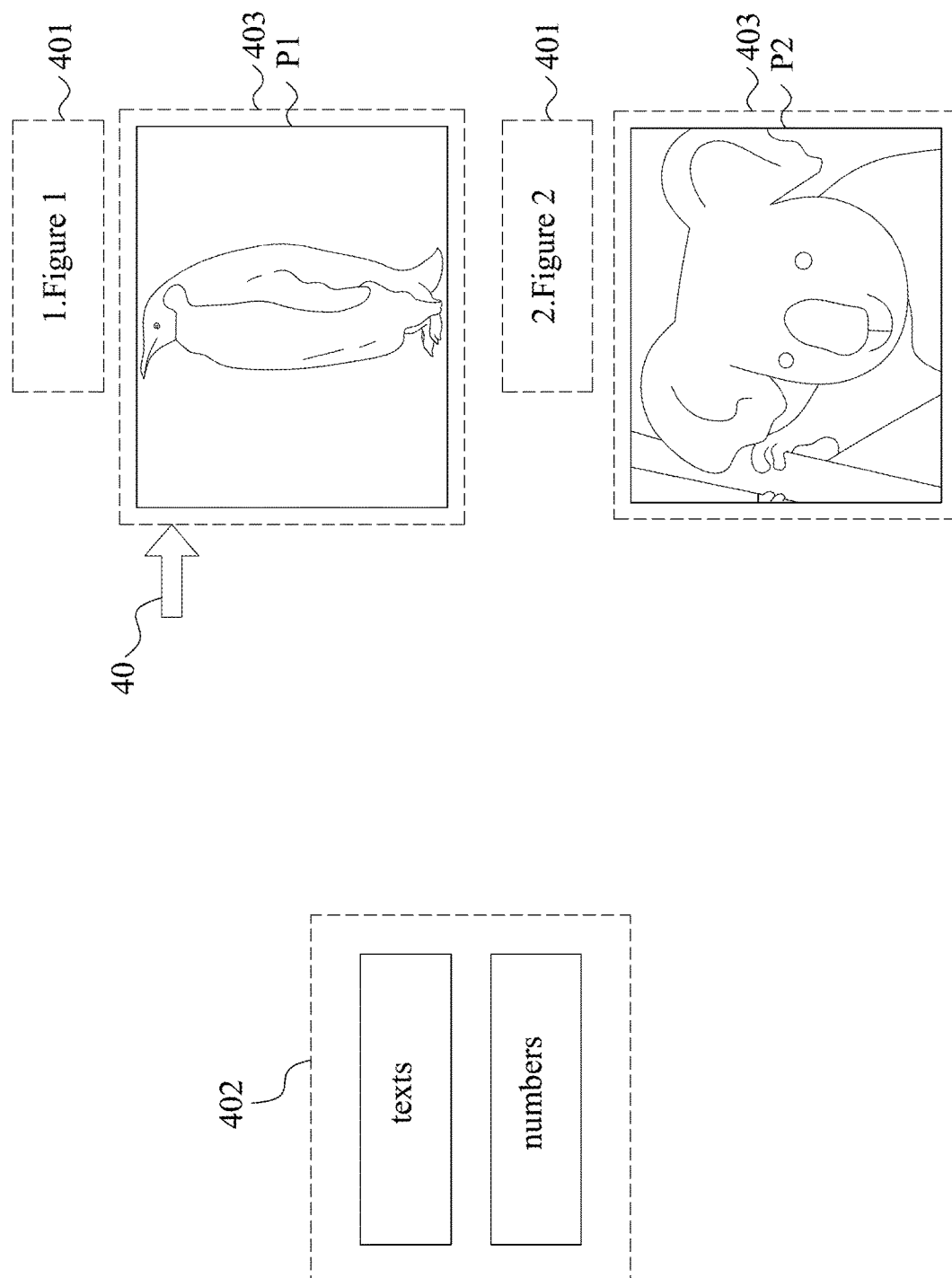
FIG. 6 is a schematic diagram of another display image of a document file according to another embodiment of the present disclosure.

Taking FIG. 6 as an example, the processor 110 calculates the matching index of each of the pictures P1 and P2 and the first string "Penguin" respectively. Since the picture P1 corresponds to the first string "Penguin" and has a matching index higher than the preset value, the display system 100 executes the step S260 to display or move the marker 40 on the display image 400 to the coordinates corresponding to the picture P1.

On the other hand, if the first string "Penguin" does not correspond to any one of the pictures P1 or P2, the display system 100 may execute the step S210 again to restart the method 200 of interacting the display system 100.

In some embodiments, the module and the unit of the present disclosure may be implemented by the hardware. For example, the display module may be a display circuit (or device), the voice-to-text converting module may be a voice-to-text converting circuit (or device), the analysis module may be an analysis circuit (or device), the semantic analysis unit may be a semantic analysis circuit (or device), and the image analysis unit may be an image analysis circuit (or device).

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present disclosure cover modifications and variations of this disclosure provided they fall within the scope of the following claims.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

Although the present disclosure has been described in considerable detail with reference to certain embodiments thereof, other embodiments are possible. Therefore, the spirit and scope of the appended claims should not be limited to the description of the embodiments contained herein.

What is claimed is:

1. A method of interacting with a display system, comprising:
   receiving an audio signal through an audio input device;
   converting the audio signal to corresponding text data through a voice-to-text converting module;
   generating a corresponding display image according to a document file;
   acquiring multiple identification data corresponding to the display image from the document file through an analysis module, wherein the identification data comprises a first identification data and at least one second identification data, the first identification data corresponds to layout information of the document file, and each of the at least one second identification data corresponds to text information of the document file or image information of the document file;
   comparing the text data with the identification data; and
   moving or displaying a marker on the display image through the display system according to a coordinate of one of the identification data if the text data corresponds to one of the identification data;
   wherein the step of comparing the text data with the identification data comprises:
      analyzing the text data to generate a first string through the analysis module; and
      comparing the first string with the first identification data of the display image, wherein the first string is compared with the at least one second identification data of the display image if the first identification data does not correspond to the first string;
   wherein the step of comparing the first string with the at least one second identification data of the display image comprises:
      calculating a first matching index according to the first string and the at least one second identification data.

2. The method of interacting with a display system of claim 1, wherein the layout information of the document file comprises a layout design, an item symbol, or an item number of the document file.

3. The method of interacting with a display system of claim 1, wherein the display system moves or displays the marker according to the coordinate of the first identification data if the first identification data corresponds to the first string.

4. The method of interacting with a display system of claim 1, wherein the step of comparing the first string with the at least one second identification data of the display image further comprises:
   calculating a second matching index according to the first string and the at least one second identification data corresponding to the image information if the first matching index is less than a preset value, wherein the first matching index is calculated according to the first string and the at least one second identification data corresponding to the text information.

5. The method of interacting with a display system of claim 1, wherein the first matching index of the first string and the identification data is calculated based on natural language processing.

6. The method of interacting with a display system of claim 4, wherein the higher the first matching index, the higher a matching degree of the first string and the at least one second identification data corresponding to the text information of the document file, the higher the second matching index, the higher the matching degree of the first string and the at least one second identification data corresponding to the image information of the document file.

7. A display system, comprising:
   a display module, being configured to generate a corresponding display image according to a document file;
   an audio input device, being configured to receive an audio signal;

a voice-to-text converting module, being coupled to the audio input device, being configured to convert the audio signal to corresponding text data;

an analysis module, being configured to acquire multiple identification data corresponding to the display image from the document file and store the identification data in a memory, wherein the identification data comprises a first identification data and at least one second identification data, the first identification data corresponds to layout information of the document file, and each of the at least one second identification data corresponds to text information of the document file or image information of the document file, wherein the analysis module comprises:

a semantic analysis unit, being configured to acquire the at least one second identification data of the document file corresponding to the display image and generate a first string according to the text data; and an image analysis unit, being configured to acquire the at least one second identification data of the document file corresponding to the display image;

a processor, being coupled to the memory and the display module, being configured to read the identification data and perform following operations:

comparing the text data with the identification data;

moving or displaying a marker on the display image according to a coordinate of one of the identification data if the text data corresponds to one of the identification data; and wherein when the processor is configured to compare the text data with the identification data, the processor is further configured to perform following operations:

comparing the first string with the first identification data of the display image; and comparing the first string with the at least one second identification data of the display image if the first identification data does not correspond to the first string, wherein when the processor is configured to compare the first string with the at least one second identification data, the processor is further configured to perform following operations:

calculating a first matching index according to the first string and the at least one second identification data.

8. The display system of claim 7, wherein the layout information of the document file comprises a layout design, an item symbol, or an item number of the document file.

9. The display system of claim 7, wherein the processor is further configured to perform following operations:

moving or displaying the marker according to the coordinate of the first identification data if the first identification data corresponds to the first string.

10. The display system of claim 7, wherein when the processor is further configured to perform following operations:

calculating a second matching index according to the first string and the at least one second identification data corresponding to the image information if the first matching index is less than a preset value, wherein the first matching index is calculated according to the first string and the at least one second identification data corresponding to the text information.

11. The display system of claim 7, wherein the first matching index of the first string and the identification data is calculated based on natural language processing.

12. The display system of claim 10, wherein the higher the first matching index, the higher a matching degree of the first string and the at least one second identification data corresponding to the text information of the document file, the higher the second matching index, the higher the matching degree of the first string and the at least one second identification data corresponding to the image information of the document file.

* * * * *